United States Patent
Maffione et al.

(10) Patent No.: US 8,819,222 B2
(45) Date of Patent: Aug. 26, 2014

(54) METHOD AND SYSTEM FOR PROFILING DATA TRAFFIC IN TELECOMMUNICATIONS NETWORKS

(75) Inventors: Eugenio Maria Maffione, Turin (IT); Roberta Maglione, Turin (IT); Roberto Pagnin, Turin (IT); Mario Ullio, Turin (IT)

(73) Assignee: Telecom Italia S.p.A., Milan (IT)

( * ) Notice: Subject to any disclaimer, the term of this patent is extended or adjusted under 35 U.S.C. 154(b) by 358 days.

(21) Appl. No.: 13/126,368

(22) PCT Filed: Oct. 27, 2008

(86) PCT No.: PCT/EP2008/064524
§ 371 (c)(1),
(2), (4) Date: Apr. 27, 2011

(87) PCT Pub. No.: WO2010/048980
PCT Pub. Date: May 6, 2010

(65) Prior Publication Data
US 2011/0208862 A1    Aug. 25, 2011

(51) Int. Cl.
*G06F 15/173* (2006.01)
*H04L 29/08* (2006.01)

(52) U.S. Cl.
CPC ...................................... *H04L 67/22* (2013.01)
USPC .......................................... 709/224; 709/225

(58) Field of Classification Search
USPC ............... 709/200, 223, 224, 250; 705/14.49, 705/14.51, 14.53
See application file for complete search history.

(56) References Cited

U.S. PATENT DOCUMENTS

| | | | | |
|---|---|---|---|---|
| 5,948,061 A | * | 9/1999 | Merriman et al. | 709/219 |
| 6,839,680 B1 | * | 1/2005 | Liu et al. | 705/7.33 |
| 7,065,360 B2 | * | 6/2006 | Yahagi | 455/437 |

(Continued)

FOREIGN PATENT DOCUMENTS

| | | | |
|---|---|---|---|
| WO | 98/59481 A1 | 12/1998 |
| WO | 01/11821 A1 | 2/2001 |

(Continued)

OTHER PUBLICATIONS

International Search Report and Written Opinion mailed Jul. 21, 2009, PCT/EP2008/064524.
J. Hu and N. Zhong, "Clickstream Log Acquisition with Web Farming", in Proc. Web Intelligence, 2005, pp. 257-263.
CN—Notification of the Second Office Action mailed Mar. 24, 2014, CN Appln. 200880132205.8, English translation.

*Primary Examiner* — Hassan Kizou
*Assistant Examiner* — Phyllis Book
(74) *Attorney, Agent, or Firm* — Banner & Witcoff, Ltd.

(57) ABSTRACT

A method of profiling communication traffic of users in a data network, comprising: monitoring communication traffic originated by a user of a communication terminal; and assigning to the user of the communication terminal a unique and anonymous user traffic identifier, wherein the user traffic identifier is related to a user address assigned to the communication terminal in the data network. Also, the user traffic identifier is adapted to be included in the communication traffic with respect to that user. The method further includes communicating the unique and anonymous user traffic identifier to the user terminal and having the user communication terminal include the user traffic identifier in the user traffic, upon receipt of communication traffic including the user traffic identifier, obtaining a descriptor of the received communication traffic useful to describe the detected traffic and at least temporarily storing the obtained descriptor; and building an anonymous user profile related to the user's communication activities based on the stored descriptors.

19 Claims, 5 Drawing Sheets

(56) References Cited

U.S. PATENT DOCUMENTS

| | | | |
|---|---|---|---|
| 8,069,169 B2 * | 11/2011 | Fitzpatrick et al. | 707/732 |
| 8,108,245 B1 * | 1/2012 | Hosea et al. | 705/7.33 |
| 2008/0098220 A1 * | 4/2008 | Spalink et al. | 713/168 |
| 2008/0103971 A1 * | 5/2008 | Lukose et al. | 705/40 |
| 2008/0235351 A1 * | 9/2008 | Banga et al. | 709/218 |
| 2010/0100445 A1 * | 4/2010 | Flood et al. | 705/14.64 |

FOREIGN PATENT DOCUMENTS

| | | |
|---|---|---|
| WO | 2006/031402 A2 | 3/2006 |
| WO | WO 2006031402 A2 * | 3/2006 |
| WO | 2007/033097 A2 | 3/2007 |

* cited by examiner

METHOD AND SYSTEM FOR PROFILING DATA TRAFFIC IN TELECOMMUNICATIONS NETWORKS

CROSS REFERENCE TO RELATED APPLICATIONS

This is a U.S. National Phase Application under 35 U.S.C. 371 of International Application No. PCT/EP2008/064524, filed Oct. 27, 2008, which was published Under PCT Article 21(2), the entire contents of which are incorporated herein by reference.

BACKGROUND OF THE INVENTION

1. Field of the Invention

The present invention relates in general to the field of telecommunications, more particularly to data networks. Specifically, the present invention deals with the aspects of data traffic monitoring, particularly, albeit not exclusively, in IP (Internet Protocol) data networks, for the purpose of profiling users.

2. Discussion of the Related Art

Profiling of data traffic is useful in order to be able to offer customized services to users. For example, by observing the network data traffic corresponding to a certain user, a profile thereof can be created, based on which it is for example possible to send to the user personalized advertisement, that may be included in banners of the web pages displayed through a web browser, or in pop-up windows; this allows exploiting the enormous potentialities of the Internet surfing as an extremely powerful advertisement means.

Through the years, content providers have developed several solutions to achieve this goal, based on the technical capabilities from time to time made available by the end systems (clients and servers).

Some known solutions are particularly invasive, as they require the installation of specific application programs on the user terminal. These solutions have had scarce success, mainly due to the renitence of the users to install on their terminals software which may be regarded, although it is not, as malware or spyware.

Other known solutions exploit, for collecting information useful to build a user profile, the interactions of the user with one or more federated content provider servers. These solutions are generally better accepted by the users, but the amount of information they can provide is limited, and only a part of the user's behaviors can be tracked.

Telecommunications network (telecom) operators and Internet connectivity Service Providers (ISPs) are in a privileged position compared to content providers, because all the data traffic of a certain user passes there through.

Recently, techniques have been developed that allow a network operator to monitor the users' activities at an application level. These techniques make use of "Internet appliances" that analyze the traffic passing over a telecommunications network and are capable of producing statistical reports with detailed analysis at the application level, even for every single user. Nevertheless, these techniques have not been fully deployed, in view of the legal restrictions posed on telecom operators, particularly in connection with privacy issues, which in many countries forbid a telecom operator to associate to users respective logs of their activities, like the exchanged data traffic. For these reasons, this operator-side data traffic profiling is often not exploitable.

An example of this type of profiling techniques is given in WO 2007/033097, which discloses communication traffic monitoring and controlling systems and methods that allow for controlling communication traffic over the Internet based on the identity of particular users using potentially volatile information, such as a dynamically assigned IP address. The system and method allow a controller to personalize services for users without the need for the user to supply personal information, such as his/her name, address, and the like, and without the need to have computer programs or code installed on the user's computer. An "IP appliance" needs to be introduced in the network, which monitors the application-level traffic in respect of single users. A traffic analysis module analyzes the traffic directed from the users' clients to the network servers of the ISP, and the related responses. In particular, the analysis is made on the protocols (e.g., RADIUS, DHCP—Dynamic Host Configuration Protocol) used by the ISP to authorize the user's access to the network and to dynamically configure the user's terminal IP address; based on the protocols analysis, every IP address is associated with a specific customer of the ISP based on the access credentials. The IP appliance is thus capable of establishing an association between every IP packet flowing over the network and a specific user, and thus to update the user profile.

U.S. Pat. No. 5,948,061 discloses methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate advertisement based upon profiling of users and networks. An "Advertising Server Process" provides user profiling services. When a user exploiting a browser accesses an "Affiliate Web Site", the addressed web page contains a reference to an advertisement banner provided by the Advertising Server Process. The advertisement banner contains in turn a link to an advertisement web page on an Advertiser's Web Site, to be displayed if and when the user selects the advertisement banner. When the browser downloads the advertisement banner, it provides to the Advertising Server Process information including the IP address, a cookie (if the browser is enabled), the browser type and version, the operating system etc.; the Advertising Server Process analyzes this data to profile the user, and personalizes the advertisement banners.

US 2008/0098220 discloses a method and system for monitoring users on one or more computer networks, disassociating personally identifiable information from the collected data, and storing it in a database so that the privacy of the users is protected. The system includes monitoring transactions at both a client and a server, collecting network transaction data, and aggregating the data collected at the client and at the server. The system receives a user identifier and uses it to create an anonymized identifier. The anonymized identifier is then associated with one or more users' computer network transactions. The data is stored by a collection engine and then aggregated to a central database server across a computer network.

SUMMARY OF THE INVENTION

The Applicant believes that known solutions for profiling users of data networks based on the traffic they generate are not satisfactory, for several reasons.

In particular, the solution described in WO 2007/033097 cannot be exploited in several countries, because it contravenes to existing privacy regulations, which forbid the collection of data allowing an association between a user's personal data and the data he/she exchanges.

The solution described in U.S. Pat. No. 5,948,061 has a limitation in that the Advertising Server Process is invoked only by the Affiliate Web Site, thus it can profile a user limitedly to his/her accesses to affiliate web sites, and not to any web site. The information gathered is thus limited, and the user profiling is limited too.

The technique disclosed in US 2008/0098220 is similar to other solutions that extract anonymous keys from the RADIUS traffic and exploit them to generate anonymous network surf related data. The direct use of RADIUS data may pose privacy regulation problems to the deployment of the solution in some countries.

An object of the present invention is to provide an improved solution for the profiling of users of data networks based on the data traffic they generate, which is not affected by the problems and limitations of the solutions known in the art, particularly in respect of user privacy issues.

According to an aspect of the present invention, a method of profiling communication traffic of users in a data network is provided, the method comprising:
   monitoring communication traffic originated by a user of a communication terminal;
   assigning to the user of the communication terminal a unique and anonymous user traffic identifier, wherein the user traffic identifier is related to a user address assigned to the communication terminal in the data network, and wherein the user traffic identifier is adapted to be included in the communication traffic in respect of that user;
   communicating the unique and anonymous user traffic identifier to the user terminal and having the user communication terminal include the user traffic identifier in the user traffic,
   upon receipt of communication traffic including the user traffic identifier, obtaining a descriptor of the received communication traffic useful to describe the detected traffic and at least temporarily storing the obtained descriptor; and
   building an anonymous user profile related to the user's communication activities based on the stored descriptors.

The user traffic identifier may comprise a cookie adapted to be included in the communication traffic generated by and addressed to the user terminal.

Said assigning the user traffic identifier may comprise:
   upon receipt of communication traffic originated by the user terminal, assessing whether the received communication traffic includes the user traffic identifier, and, in the negative case, generating a unique and anonymous user traffic identifier to be assigned to the network address of the user terminal.

Upon receipt of communication traffic originated by the user terminal not including the unique and anonymous user traffic identifier, the user terminal may be requested to re-send the communication traffic to a user traffic identifier assignment function. The user traffic identifier assignment function may then generate the unique user traffic identifier and include it in a response sent to the user terminal, said response sent to the user terminal requesting the user terminal to re-send the communication traffic including the user traffic identifier.

Said requesting the user terminal to re-send the communication traffic to a user traffic identifier assignment function may include sending to the user terminal a 303 SEE OTHER HTTP message including a URL of the user traffic identifier assignment function, and including an original URL contained in the communication traffic received from the user terminal.

Said response sent by the user traffic identifier assignment function to the user terminal may include a request for the user terminal to re-send the communication traffic with the user traffic indication to the user traffic identifier assignment function.

Upon receipt from the user terminal of said response including the user traffic identifier, a monitoring of the user communication traffic may be started, and a further response may be sent to the user terminal requesting the user terminal to re-send the communication traffic to the original destination.

Said descriptor may comprise one or more of: information related to the end points involved in the transaction, and information about the time the transaction occurred.

Said monitoring communication traffic originated by the user of the communication terminal may include analyzing communication traffic packets originated by the user terminal.

Said building a user profile may include building a list of web pages accessed by the user in a web browsing session.

According to another aspect of the present invention, a system is provided for profiling communication traffic of users in a data network, the system comprising:
   a monitoring function adapted to:
      monitor communication traffic originated by or addressed to a communication terminal of a user;
      assess whether the communication traffic of said user is being monitored based on a user address in the data network and the inclusion in the communication traffic of unique and anonymous user traffic identifier; and
      either request the user terminal to re-send the communication traffic to a user traffic identifier assignment function in case the received communication traffic does not include the user traffic identifier, or to extract a descriptor of the communication traffic and causing at least temporary storage thereof and let the communication traffic reach the intended destination in case the received communication traffic includes the user traffic identifier;
   wherein the user traffic identifier function is adapted to:
      generate the unique user traffic identifier;
      send a response to the user terminal including the user traffic identifier, said response requesting the user terminal to re-send the communication traffic to the original destination including the user traffic identifier.

Said user traffic identifier may comprise a cookie.

For the purposes of the present invention, by "unique and anonymous user traffic identifier" it is intended an identifier that is univocally assigned to the user, particularly to his/her communication terminal, and even more particularly to a network address assigned thereto, such an identifier being anonymous as far as personal, sensitive data about the user which may impact privacy issues (e.g., the user name, address, contractual data) are concerned, and which is adapted to be included in all the communication traffic originated by or addressed to the user, so as to be traceable by monitoring the network communication traffic.

Thanks to the solution according to embodiments of the present invention, it is ensured that the user profiling data collected by a network operator in respect of data traffic originated by a user remain intrinsically anonymous, and it is guaranteed that an association of a unique user identifier assigned to the user for collecting the user profiling data with user's personal, possible sensible information (like the user name, address, date of birth etc.) and contractual data is prevented. The solution according to the present invention thus complies with privacy issues and regulations.

Another advantage of the solution according to embodiments of the present invention is that it allows a full, complete profiling of the data traffic generated by a user, without needing the installation of dedicated software on the user terminal.

BRIEF DESCRIPTION OF THE DRAWINGS

These and other features and advantages of the present invention will be best understood by reading, in conjunction with the attached drawings listed herebelow, the following detailed description of some exemplary and non-limitative embodiments thereof. In the drawings.

DETAILED DESCRIPTION OF EMBODIMENTS OF THE INVENTION

In the following, a solution according to exemplary and non-limitative embodiments of the present invention will be presented and described in detail. Those skilled in the art will however recognize that several modifications to the described embodiments are possible, and that the present invention can be embodied in different ways.

Figure 1:
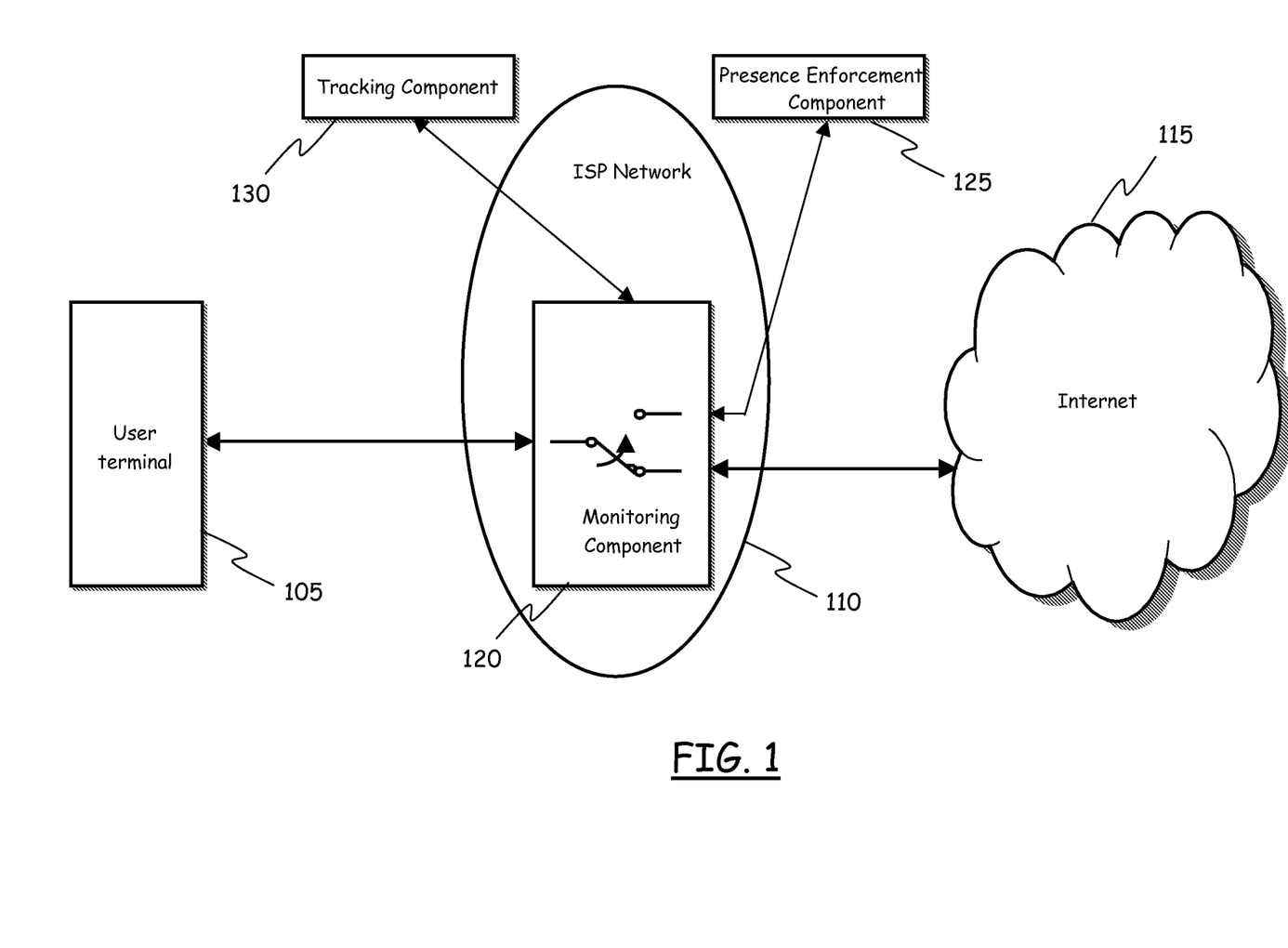
FIG. 1 schematically shows an exemplary scenario of use of a solution according to an embodiment of the present invention, and an exemplary architecture thereof.

In particular, the scenario of use herein considered by way of example, and depicted in FIG. 1, is that of a user who has a user data processing terminal 105 enabling the user to communicate over a data network, particularly an IP network, and which, exploiting the services of a network connectivity service provider 110, for example an ISP, can connect (for example using an access gateway or a dial-up modem) to a data network, like the Internet 115, and/or to any other data network, like for example open WANs (Wide Area Networks). The ISP may be or belong to a telephone/telecommunications company, for example a virtual telecommunications/telephony operator (i.e. a company that provides phone service but does not have its own licensed frequency allocation of radio spectrum, nor does it necessarily have all of the infrastructure required to provide mobile telephone service, and that resells to customers the telephony services bought from another telephone/telecommunications company).

In the exemplary scenario herein considered, the solution according to an embodiment of the present invention is exploited to monitor the Internet (IP) traffic seen by the ISP 110 in respect of its subscriber users. The IP traffic may be fully or at least partially recorded, for example for a limited period of time, to facilitate the IP traffic analysis directed to derive information about the user habits/behaviour in, e.g., his/her web browsing activities, and the derived information may be used to build a user profile. The user profile may then be exploited to provide/offer to the user personalized services, like sending user-tailored advertisement messages.

A system according to an embodiment of the present invention comprises a monitoring component 120, a presence enforcement component 125 and a tracking component 130, which in operation cooperate with each other. These three components may be part of a unique system, co-located in a same physical position, or one or more of them may be distributed in different positions, depending on the needs/preferences of the ISP 110. One or more of these components may even be owned by a party different from the ISP (this is the scenario considered in FIG. 1, wherein the presence enforcement component 125 and a tracking component 130 are depicted as external to the ISP 110).

The individual functions and the interactions between the components 120, 125 and 130 are described in detail hereinafter.

Figure 2:
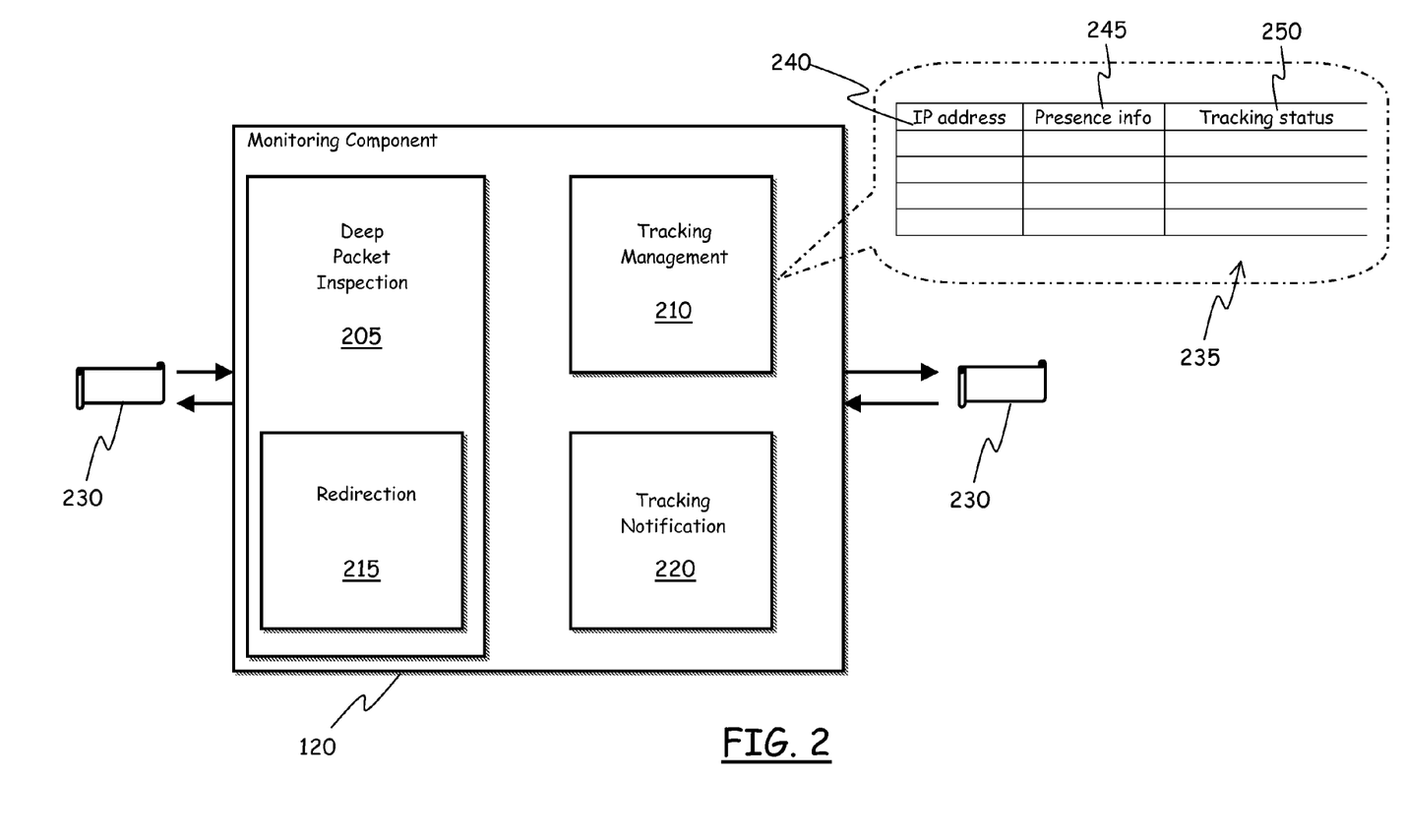
FIG. 2 shows schematically but in greater detail the functional structure of one of the components of FIG. 1.

As schematically depicted in FIG. 2, the monitoring component 120 essentially comprises four functionalities: a deep packet inspection functionality 205, including a redirection functionality 215, a tracking management functionality 210, and a tracking notification functionality 220.

The deep packet inspection functionality 205 is adapted to deeply analyze network traffic, particularly data packets 230, to recognize transmission protocols (belonging to a predetermined catalogue of transmission protocols), and to recognize patterns, within one or more data packets, that correspond to such protocols. The data packets 230 are analyzed not only in respect of their headers, but also in respect of their body or payload.

The deep packet inspection functionality 205 is assumed to be capable of analyze the traffic and to be capable of redirecting (exploiting the redirection functionality 215) the analyzed data packets to the other functionalities of the monitoring component 120.

The tracking management functionality 210 is adapted to manage the tracking of the users in respect of their communication activities in the data network, e.g. web surfing activities; according to an embodiment of the present invention, the tracking management functionality 210 tracks the users' activities exploiting a finite-state machine method, whose states represents different situations of network traffic monitoring, and wherein the transitions between states are triggered by traffic events like for example the beginning of a traffic flow, the existence of user-related presence information (discussed in detail in the following), the lapse of a timeout or other significant changes in the traffic flow.

The tracking management functionality 210 makes use of a database, for example in the form of a table 235, which is kept constantly updated by the state machine during the events processing. In an embodiment of the present invention, the table 235 comprises several entries, one in respect of each user whose activities are to be monitored. In each entry, a table field 240 is provided, adapted to store an IP address corresponding to a user which is connected to the network; associated with the field 240 is a field 245 adapted to store a user presence information; associated with the fields 240 and 245 is a further field 250 adapted to store an indication of the tracking status of that user, i.e. of whether that user is being tracked or not (as described in the following).

The redirection functionality 215 is adapted to redirect, based on specific, predetermined rules (which may take the form of configuration parameters), specific messages (received as data packets 230) that have been identified by the deep packet inspection functionality 205, by exploiting the characteristics of the considered transmission protocol, or to divert an entire traffic packets flow (typically, a redirection is an operation performed based on the recognition of the message, whereas a divert operation is performed based on the recognition of the data flow). Redirection of specific messages may for example be accomplished, in the case of the HTTP (Hyper Text Transfer Protocol), by means of the 303 SEE OTHER message, which enables an HTTP/web server, upon receipt from a client (the web browser running on a user terminal) of a request of a HTML (Hyper Text Markup Language) or web page, to redirect the client towards another web server (having a different URL—Uniform Resource Locator). According to an embodiment of the present invention, the redirection of specific messages is made towards the presence enforcement component 125, devoted to the monitoring/tracking of the user's traffic, as described in the following.

The tracking notification functionality 220 is adapted to issue notifications concerning the recognition of a searched pattern within a received data packet 230. The notifications may be issued to the tracking component 130. In an embodiment of the present invention, the tracking notification functionality 220 issues a notification by sending a descriptor of the data traffic portion comprising the pattern recognized by deep packet inspection functionality 205; the descriptor can include user-related presence information univocally related to the user to be tracked, as discussed in greater detail later. The descriptor is preferably configurable in its structure, so as to be compliant with other systems (like systems devoted to the monitoring/tracking of the user's traffic and/or to the delivery of advertisement) and with privacy legal restrictions which may vary from country to country.

The monitoring component 120 may take the form of an Internet appliance, adapted to be inserted into the packet data network 110 of the ISP/telecommunications company, for example in a point of the network chosen based on a trade off between traffic monitoring requirements and system scalability. For example, considering the network of a telecom operator of significant size, the monitoring component 120 may be located at the Points of Presence (PoP), downstream the NAS (Network Access Service) devices that control the access to the network.

Figure 3:
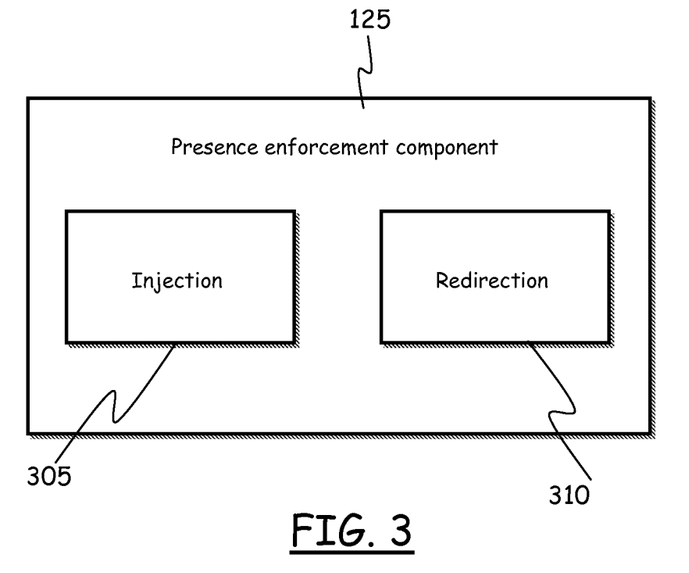
FIG. 3 shows schematically but in greater detail the functional structure of another one of the components of FIG. 1.

In an embodiment of the present invention, the presence enforcement component 125 comprises, as schematically depicted in FIG. 3, an injection functionality 305 and a redirection functionality 310.

The injection functionality 305 is adapted to generate and insert, into the network traffic related to a certain user, information related to that user so as to mark the data traffic of specific users in a way that is univocally related thereto; in particular, the data traffic marking is achieved by means of user-related presence information univocally related to that user. The user-related presence information forms the aggregation entity between a data traffic chunk (a data packet 230) received from the monitoring component 120, or from the user terminal 105, and the data traffic chunks subsequently tracked by the monitoring component. The user-related presence information is used as a reference for tracking the network traffic generated by that user in that session. The user-related presence information is anonymous, because it does not contain references to data that may lead to user's personal information (like the name, date of birth, address etc.).

According to an exemplary embodiment of the present invention, considering the case of web browsing activities, the user-related presence information may comprise a cookie that the presence enforcement component 125 univocally assigns to a certain user. As known in the art, cookies (also referred to as HTTP cookies, or web cookies), are parcels of text sent by an HTTP server to a web client (a browser) and then sent back unchanged by the client each time it accesses that server. An HTTP server that receives a request by a client (a web browser) may insert a cookie (set_cookie) into the response sent to the client, so that, in the successive transactions with servers of the same domain of the server that inserted the cookie, the client includes the cookie into the requests sent to such other servers; the latter, recognizing the presence of the cookie in the request, will be able to assess that the considered client already presented itself to one of the servers of the domain, and may process the information. According to an embodiment of the present invention, the presence enforcement component 125 assigns to the users univocal presence information cookies, and sends the assigned presence information cookies to the web browsers of the users; the presence information cookies are stored locally at the user terminal 105, and the web browser of the user includes the presence information cookie in the subsequent requests, so that the presence information cookie may be recognized and processed by the monitoring system.

The redirection functionality 310 is adapted to redirect the specific messages towards their original destination (that means, e.g. for HTTP, the original URL requested), or towards the Presence Enforcement Component 125 in order to enable the tracking of the user-related network traffic.

In an embodiment of the present invention, the presence enforcement component 125 comprises an application software installed and running on a server; for example, considering HTTP traffic, a web server running a web application may be used.

Figure 4:
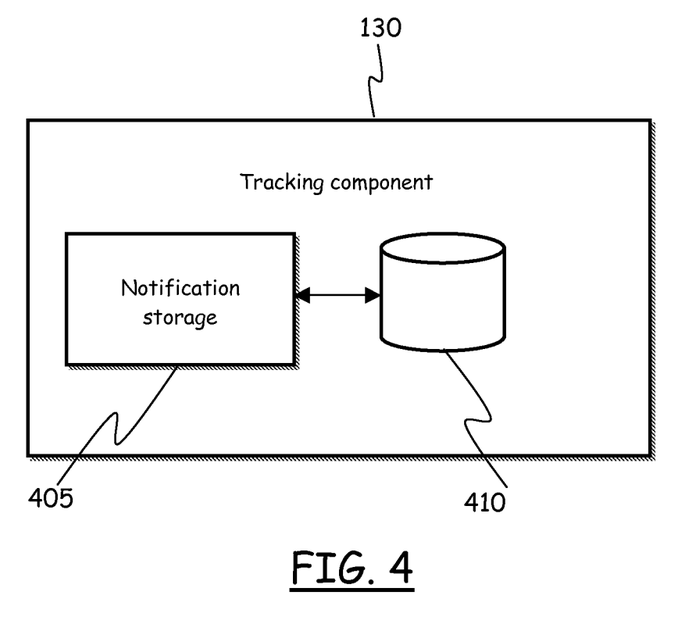
FIG. 4 shows schematically but in greater detail the functional structure of still another one of the components of FIG. 1.

According to an embodiment of the present invention, the tracking component 130 comprises, as schematically depicted in FIG. 4, a notification storage functionality 405 adapted to manage the storage of notifications received from the monitoring component 120, particularly from the tracking notification functionality 220. The storage functionality 405 is designed to store the notifications into a structured archive 410, for example a relational database. In particular, the notification storage functionality 405 stores in the archive 410 the information included in the notification descriptor that the tracking notification functionality 220 of the monitoring component 120 sends to the tracking component 130 each time the monitoring component 120 detects traffic packets 230 in respect of a user whose activities are being tracked.

The user-related presence information included in the notification descriptor is exploited to aggregate the information included in the notification received from the monitoring component 120 with data already stored in the database 410, ensuring that the users are kept anonymous. The aggregation, in the database 410, of information related to the network traffic generated by a certain user is useful to allow processing of the information about the user activities/behaviour, in one or more time intervals, that may be configurable, so as to build a user profile. For example, considering the activity of browsing of web sites, it is possible to define the "clickstream", i.e. the sequence of "clicks" made by the user, analyzing the sequence of visited web sites; this allows determining the interests of the user. Based on the user profile thus built, the tracking component 130, and/or other components (data mining systems, business intelligence systems), possibly external to the monitoring system of the described invention embodiment, may offer/propose personalized services.

In an embodiment of the present invention, the tracking component 130 may comprise an application software installed and running on a server.

The operation of the system according to the present invention is now described. Bidirectional data traffic from/to the user terminal 105 flows through the monitoring component 120. The monitoring component 120 either lets the data traffic reach the intended destination (Internet 115, user terminal 105), or redirects it to the presence enforcement component 125 (by means of the redirection functionality 215).

The monitoring component 120 manages the monitoring state of the traffic for every tracked IP address in the table 235, which is kept constantly up to date based on the monitoring phase of the traffic generated by that IP address. At the beginning, the absence of traffic in respect of that IP address corresponds to the absence of any entry in the table 235 corresponding to such an IP address. The deep packet inspection functionality 205 inspects the content of the received data packets The first time traffic in compliance with the configured filtering rules (rules that can be configured on the deep packet inspection functionality 205 useful for recognizing a specific traffic flow, e.g. for detecting HTTP messages, and to accordingly react, for example by redirecting the messages) is detected for that IP address, the tracking management functionality 210 of the monitoring component 120 creates an entry in the table 235 and puts into the newly created entry the IP address of the entity (the user terminal 105) that originated the traffic. The tracking management functionality 210 also sets, in the field 250 of the table 235 corresponding to the newly created entry, the current monitoring status of that user, for example according to what described hereinafter.

Figure 5:
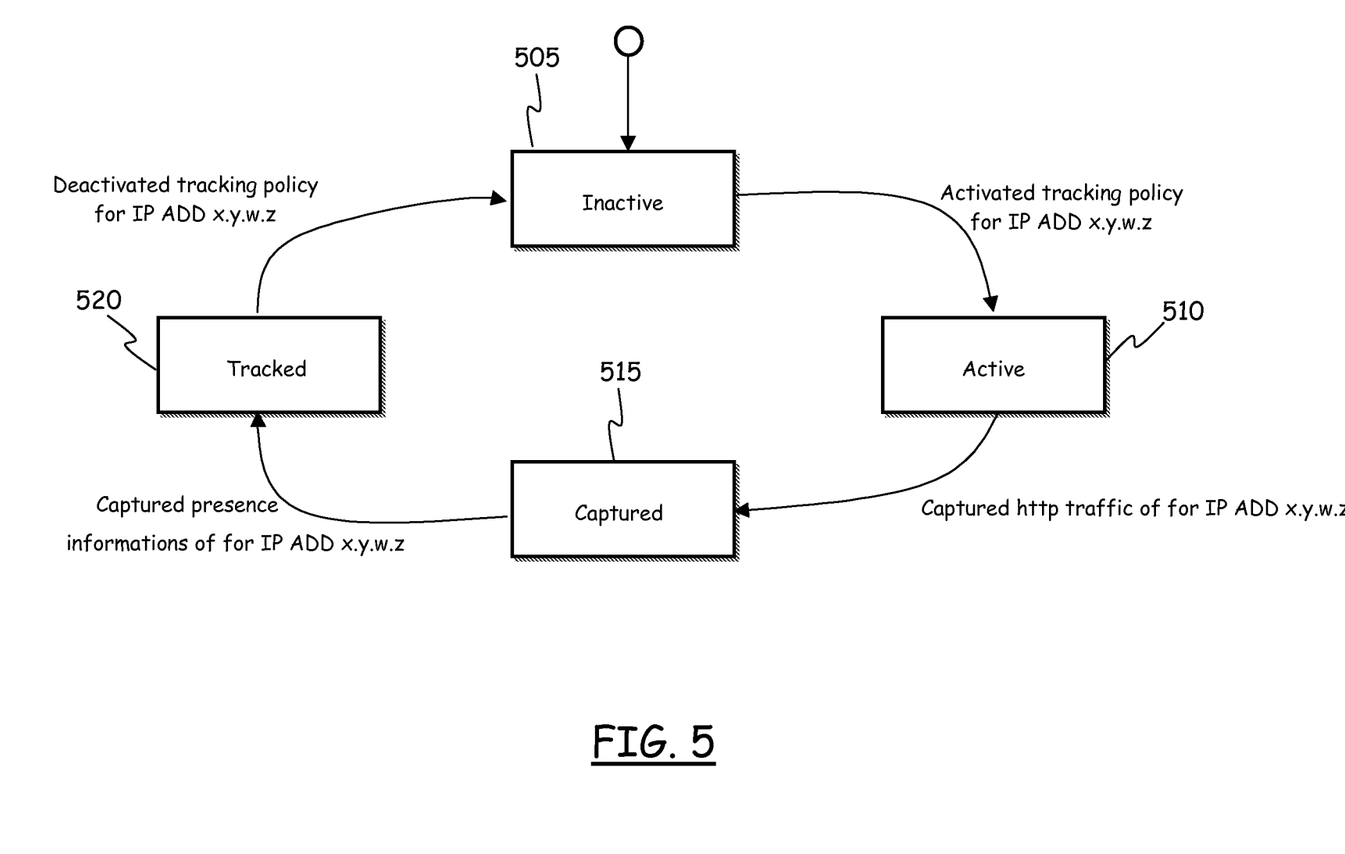
FIG. 5 schematically depicts the operation of a state-machine that, in an embodiment of the present invention, is implemented in the component of FIG. 2.

According to an embodiment of the present invention, the tracking management performed by the monitoring component 120 in respect of every user (seen as an IP address) is based on a finite state machine model. Referring to FIG. 5, a state-transition diagram for a generic user is pictorially shown. The states and the events causing transitions between states are described hereinafter. Each of the different states corresponds to a different monitoring status set by the tracking management functionality 210 in the field 250 of the table 235.

The "Inactive" state 505 is the default state, i.e. the state of a user whose traffic is not considered, i.e. not monitored by the monitoring system.

When, based on the rules specified for the operation of the monitoring component 120, the traffic of the considered user (seen as an IP address) has to be monitored, the user monitoring status changes to the "Active" state 510. The rules may for example specify that, for the considered user, the monitoring of the traffic related thereto is to be activated on a time basis.

The "Active" state 510 is the state in which the monitoring system monitors the traffic related to the considered user; when the monitoring component 120 detects user traffic complying with the specified filtering rules, the user monitoring status changes to the "Captured" state 515, and the user's IP address is put into the table 235.

In the "Captured" state 515, if the monitoring component 120 detects that the user traffic does not include the user-related presence information, the monitoring component 120 redirects the traffic related to the considered user towards the presence enforcement component 125; the presence enforcement component 125 assigns to the user a respective user-related presence information and communicates it to the user terminal 105, which subsequently includes the user-related presence information in its requests, as explained in the following. The user monitoring status remains "Captured" until the monitoring component 120 detects user traffic comprising the user-related presence information. When the monitoring component 120 detects user traffic comprising the user-related presence information, the user monitoring status changes to the "Tracked" state 520; the monitoring component 120 stores into the table 235 the user-related presence information, in association with the user's IP address.

When in the "Tracked" state 520, whenever traffic is detected, the tracking notification functionality 220 of the monitoring component 120 sends to the tracking component 130 a notification including a descriptor. The notification is received by the tracking component 130, which exploits the user-related presence information included in the descriptor to aggregate the information included in the received notification with data already stored in the database 410. The data stored in the database 410 are useful to build a user profile.

The passage from the "Tracked" state 520 to the "Inactive" state 505 may take place according to what prescribed by the rules specified for the operation of the monitoring component 120 (e.g., on a time basis).

Essentially, during its normal operation the deep packet inspection functionality 205 of the monitoring component 120 analyzes the network traffic related to selected protocols and coming from IP addresses managed internally to the ISP 110 (i.e., IP addresses that the telecommunication operator has assigned, statically or dynamically, to its subscribers; thus the monitoring, in the considered example, concerns the subscribers of the considered telecom operator).

When the deep packet inspection functionality 205 of the monitoring component 120 detects, in an incoming data packet, a pattern selected and configured as one of those "to be recognized", the tracking management functionality 210 of the monitoring component 120 looks at the table 235 and checks (looking at the content of the field 250 of the table 235) whether or not the IP address in the data packet sent by the data packet sender is under tracking. In the affirmative case, i.e. if the tracking management functionality 210 of the monitoring component 120 assesses that the considered IP address is already being tracked, the data packet is left to flow towards its intended destination, and the tracking notification functionality 220 of the monitoring component 120 sends a descriptor of the data packet to the tracking component 130, which stores the data contained in the received descriptor into the database 410. In the negative case, i.e. if the tracking notification functionality 220 of the monitoring component 120 assesses that the considered IP address is not yet under tracking, the redirection functionality 215 of the monitoring component 120 asks (the client running on) the user terminal 105 to redirect the data packet towards the presence enforcement component 125, so as to cause the user to present him/herself to the presence enforcement component 125.

When the presence enforcement component 125 receives the data packets redirected thereto by the user terminal 105, the presence enforcement component 125 assigns to that user univocal user-related presence information, and injects, i.e. inserts, it into a response sent to the user terminal 105.

The client running on the user terminal 105 receives the response sent by the presence enforcement component 125, which requests the user terminal to redirect its traffic towards the presence enforcement component 125, this time including the user-related presence information assigned and communicated thereto by the presence enforcement component 125. The redirected data traffic from the user terminal to the presence enforcement component 125 is seen by the monitoring component 120, which gets the user-related presence information included in the received data packet and puts it into the field 245 of the table 235, so as to begin tracking the activities of the user.

The monitoring component 120 also generates and notifies to the tracking component 130 a descriptor of the received data packet.

The presence enforcement component 125 then sends to the user terminal 105 a new redirection request, asking the user terminal 105 to redirect the request to the original destination.

Subsequently, each time the monitoring component 120 detects data traffic generated by that user which complies with the configured tracking rules, the monitoring component 120 generates and sends to the tracking component 130 a notification with a descriptor. Using the descriptors included in the notifications received from the monitoring component 120, the tracking component 130 progressively populates the database 410, wherein the information included in the received descriptors is aggregated to the information already present exploiting the user-related presence information. For example, considering the web surfing activities, the aggregation of information in the database 410 allows building the user's "clickstream", i.e. the sequence of web sites visited by the user (based on the clickstream, the user's interests can for example be deduced, while keeping the user anonymous).

The descriptor included in the notification sent by the tracking notification functionality 220 of the monitoring component 120 to the tracking component 130 contains data useful to describe the detected traffic chunk; such data may for example relate to the end points (e.g., in the context of Web/HTTP browsing, the user's Web browser—the client—and the contacted Web server) involved in the transaction, and to the time the transaction occurred. For example, as discussed in the foregoing, the tracking of the user's web surfing activities may provide for sending descriptors containing, as a user-related presence information, the presence information cookie assigned by the presence enforcement component 125 to the user (and which, after having been received by the user's browser, will be included in the HTTP traffic related to that user), the user's IP address, the destination host, the complete URL, the user's agent (i.e., the web browser running on the user terminal 105), a timestamp of the request by the user.

In the following, an exemplary application scenario of an embodiment of the present invention will be described, relating to the tracking of web surfing activities made by users connected to the Internet through access points of a generic ISP (like the ISP 110). The users may exploit, as user terminals 105, any kind of data processing/communication terminal, like personal computers, PDAs (Personal Digital Assistants), smart phones, capable of connecting to the Internet either directly or through other, interconnected networks (like for example a mobile telephony network). The user terminal 105 may be connected to the ISP network 110 by either a wired or a wireless connection. When the considered user accesses web sites, he/she generates network traffic. The purpose of the user activities tracking may for example be that of tracking, anonymously, the web sites visited by the users, so as to derive a "clickstream", i.e. the sequence of visited web sites (in an observation time window). The system has a distributed architecture, and the monitoring component 120 may be located in a point of the ISP network 110 characterized by a high degree of traffic aggregation so as to achieve a good trade off between amount of managed traffic, resources exploited and scalability of the monitoring system. Generally, the network of an ISP is characterized by an increasing degree of traffic aggregation while moving from the periphery thereof (the access network) towards the network core (the network backbone): the monitoring component 120 may be located in a point of the ISP network 110 which is relatively close to the network core. The monitoring component 120 is configured to monitor web traffic (i.e., traffic based on the HTTP) generated by a pool of IP address; the monitoring may be activated/deactivated on a time basis (for example, by a policy manager).

Figure 6:
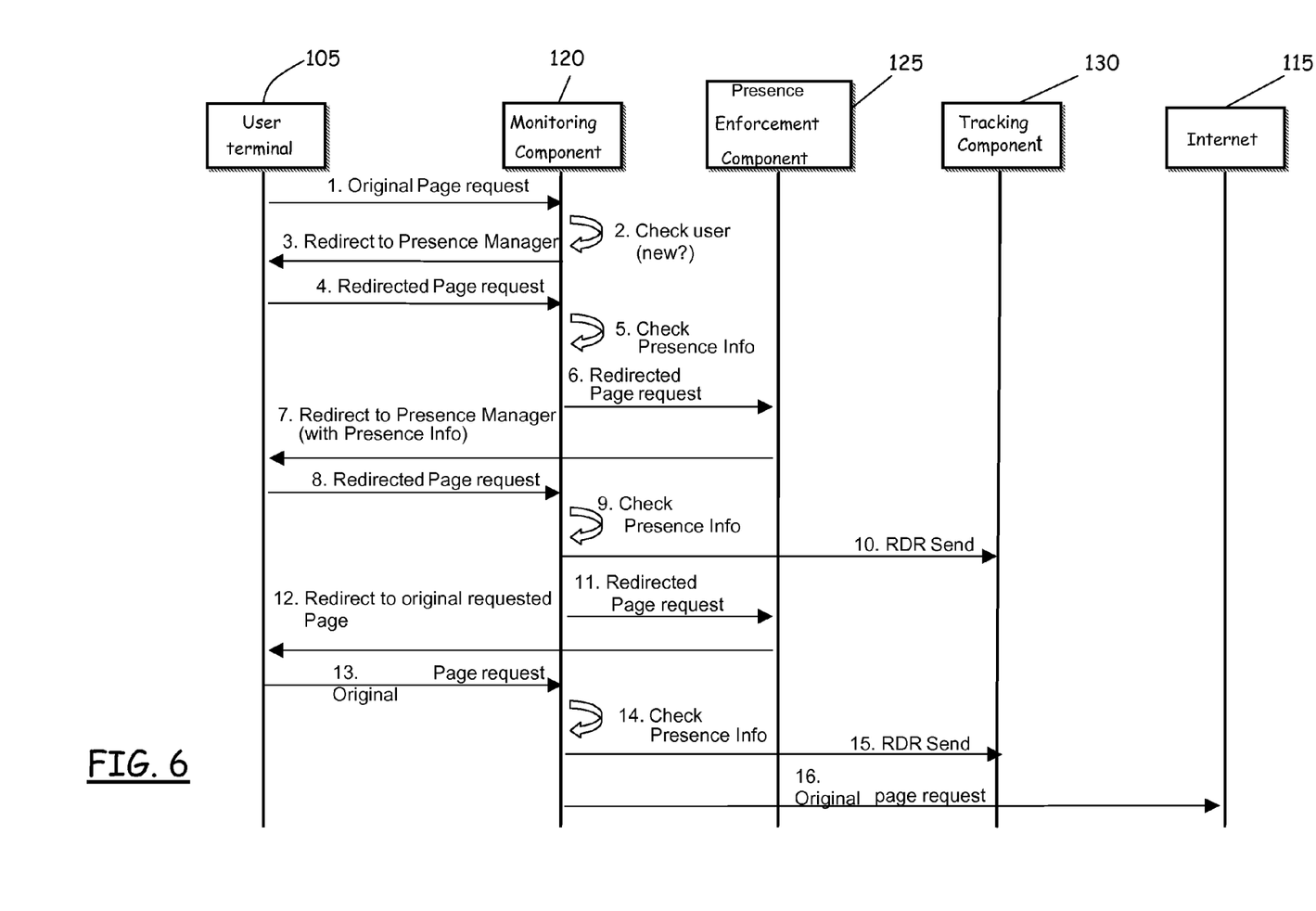
FIG. 6 schematically shows an operation sequence according to an embodiment of the present invention.

FIG. 6 schematically shows the interactions between the components during their normal operation.

When the monitoring component 120 detects web traffic, typically a web page request taking the form of a GET HTTP message (interaction 1) in respect of a specific URL coming from the user terminal 105, the monitoring component 120 checks in the table 235 whether the IP address of that user is present, and the traffic of that user is already under monitoring (interaction 2) (i.e., the user monitoring status is "Active", "Captured" or "Tracked"). Assuming, as shown in FIG. 6, that the monitoring component 120 does not find the user's IP address in the table 235 (i.e., the user monitoring status is "Inactive"), but the rules governing the behaviour of the monitoring component 120 prescribe that the traffic is to be monitored, the monitoring component 120 asks the user terminal 105 to present itself to the presence enforcement component 125 (interaction 3); for example, the monitoring component 120 may to this purpose send to the user terminal 105 a 303 SEE OTHER HTTP message with the header "Location" set to the value of the URL of the presence enforcement component 125; the original URL that was included in the GET HTTP message received from the user terminal 105 is put in the 303 SEE OTHER HTTP message as one or more parameters, where it remains until the system subsequently requests the user terminal 105 to reissue the request of interaction with that original URL. The monitoring component 120 also adds to the table 235 the IP address of the user, extracted from the original GET HTTP message (the user monitoring status, initially "Inactive", passes to the "Active" state). If instead the user is already in the "Tracked" state (i.e., the IP address of the user and the user-related presence information are already present in the table 235), the monitoring component 120 leaves the traffic flow towards the intended destination (and sends a notification to the tracking component 130).

Upon receipt of the 303 SEE OTHER HTTP message from the monitoring component 120, the user terminal 105 issues a GET HTTP message addressed to the presence enforcement component 125 (interaction 4). The new GET HTTP message sent by the user terminal 105 also includes, as one or more parameters, the URL which was included in the original web page request.

Monitoring the HTTP traffic related to the IP address of the user, the monitoring component 120 checks whether the GET HTTP message sent by the user terminal 105 to the presence enforcement component 125 contains the user-related presence information (i.e., in the considered example, the presence information cookie) (interaction 5). Since at this time the user terminal 105 has not yet been assigned and communicated the presence information cookie (the presence information cookie may be absent on the user terminal 105 at the activation of the monitoring system, or after a deletion of a previously communicated cookie forced by the user), the latter is not included in the GET HTTP message addressed to the presence enforcement component 125. The monitoring component 120 thus lets the GET HTTP message flow to the presence enforcement component 125 (interaction 6).

Upon receipt of the GET HTTP message from the user terminal 105, the presence enforcement component 125 checks for the presence of an authoritative presence information cookie for its domain. A presence information cookie (constituting the user-related presence information) authoritative for the domain of the presence enforcement component 125 is, in the HTTP protocol, a cookie authoritative for one domain only, being the domain to which the HTTP server that firstly released the cookie belongs; in this embodiment of the invention, since the presence information cookie is released by the presence enforcement component 125, the cookie is authoritative for the domain to which the presence enforcement component 125 belongs. In case such a presence information cookie is not included in the received GET HTTP message, the presence enforcement component 125 replies to the user terminal 105 with a 303 SEE OTHER HTTP message, inserting therein a new presence information cookie for that user (interaction 7), and setting in the message the "Location" header equal to the URL of the presence enforcement component 125. In other words, since the web browser running on the user terminal 105 does not have locally the presence information cookie and cannot include it in the requests it issues, the presence enforcement component 125 forces a redirection towards itself, so that the monitoring component 120 can track the interaction, capture the presence information cookie and set the beginning of the tracking phase.

Upon receipt of the 303 SEE OTHER HTTP message from the presence enforcement component 125 including the presence information cookie, the web browser running on the user terminal 105 locally stores the presence information cookie included in the received message, and issues a new web page request (GET HTTP message), addressing it to the URL present in the "Location" header of the message (interaction 8), i.e. to the presence enforcement component 125.

The new GET HTTP message sent by the user terminal 105, addressed to the presence enforcement component 125 and this time including the presence information cookie, is tracked by the monitoring component 120 (interaction 9), which looks for the presence information cookie in the received GET HTTP message. Finding the cookie, the monitoring component 120 extracts it from the message and stores it in the table 235 in association with the IP address of the user, and further changes the user state to "Tracked". The monitoring component 120 then generates and sends to the tracking component 130 a "start tracking" notification including a descriptor of the URL of the presence enforcement component 125 (interaction 10). The tracking component 130 stores the received descriptor into the database 410. The monitoring component 120 then lets the web page request flow towards its destination which is the presence enforcement component 125 (interaction 11).

The presence enforcement component 125 receives the GET HTTP message and replies with a further 303 SEE OTHER HTTP message (interaction 12), with the "Location" header set equal to the originally requested URL, and thus triggering a new web page request issued by the user terminal 105 for the originally requested URL (interaction 13); this new request is tracked by the monitoring component 120 in the way described above (interactions 14 and 15), and the monitoring component 120 lets the request flow towards its original destination (interaction 16).

Subsequent page requests (GET HTTP messages) from the user terminal 105 include the presence information cookie, and are monitored transparently by the monitoring component 120, which generates and notifies the related descriptors to the tracking component 130; the tracking component 130 aggregates the received descriptors in the database 410 based on the user-related presence information (presence information cookie) previously stored, thereby creating a clickstream of the user, for example for a predetermined, fixed or configurable observation time. The monitoring component 120 further lets the web page requests from the user terminal 105 flow towards their destination.

Preferably, in order to increase the level of privacy, the tracking component 130 discards the value of the user's IP address from the descriptor received from the monitoring component 120 (only the user-related presence information is exploited for identifying that user). This improves the level of anonymity of the stored information, because there is no link between them and the user. In this respect, it is observed that IP addresses are usually assigned to users dynamically, i.e. they typically change from session to session, but also in case of a static IP assignment, the IP address alone does not unambiguously identify a unique subject, unless the IP address is correlated to other personal information of the user.

In the exemplary application scenario described above, all the interactions between the different players (user terminal, monitoring component, presence enforcement component, tracking component) are compliant to the HTTP, included the management of the presence cookie.

The tracking session may correspond to an observation time window (tracking time), configurable on the monitoring component and the tracking component, during which the HTTP traffic of a user connected to the ISP network is tracked. The tracking time may be equal to or greater than a timeout, elapsed which it is assumed that the user ceased to generate traffic. The elapse of the timeout causes the removal of the entry with the IP address of the user from the table 235 of the monitoring component 120.

Should a history of the different clickstreams of a certain user be stored instead of being deleted after the respective tracking session, the presence information cookie forms the link between the data inherent to the different clickstreams of that user. This possibility of aggregating multiple data allows a more efficient and refined profiling of the user. Also, different users, although sharing a same IP address, are discriminated based on the user-related presence information.

The solution according to the present invention, particularly the monitoring component 120, the presence enforcement component 125 and the tracking component 130, may be implemented in software, in hardware, or partly in software and partly in hardware.

The solution according to the present invention is useful for collecting information from network data traffic generated by a user for the purpose of establishing a user profile, for example, but not limitedly, for sending to the user tailored advertisement and/or purchase/rent suggestions.

The location within the network of the telecommunication operator of the monitoring system according to the present invention, either in the form of a single entity, with all its components co-located in a same point, or in the distributed form, may vary depending on several factors, such as the architecture of the ISP network, the number of users to be monitored and tracked, the monitoring system scalability and reliability.

Thanks to its flexibility, the solution according to the present invention can be applied to any kind of computer-based communications systems, like the Internet and wired or wireless, mobile telephony networks; the solution of the present invention enables the monitoring and tracking of data traffic generated by the most disparate user appliances, like computers, PDAs, smart-phones, and in general by any terminal that can connected to a network which is interconnected to an IP network, like the internet, being assigned an IP address.

The solution according to the present invention also allows discriminating among several users that generate traffic from different terminals while presenting themselves with a unique IP address (something typical in the case of different terminals connected to an xDSL modem); this is made possible by the injection into the data traffic of user-related presence information, which enable to discriminate among different users while at the same time preserving the users' anonymity.

The invention claimed is:

1. A method of profiling communication traffic of users in a data network, comprising:
   monitoring communication traffic originated by a user of a communication terminal;
   assigning to the user of the communication terminal a unique and anonymous user traffic identifier, wherein the user traffic identifier is related to a user address assigned to the communication terminal in the data network, and wherein the user traffic identifier is adapted to be included in the communication traffic with respect to that user;
   communicating the unique and anonymous user traffic identifier to the user communication terminal to allow the user communication terminal to include the user traffic identifier in user traffic;
   upon receiving communication traffic including the user traffic identifier, obtaining, by a first device, a descriptor of received communication traffic useful to describe the received traffic, sending, by the first device, a tracking notification including the obtained descriptor, and allowing the received communication traffic to reach an intended destination of the received communication traffic;
   at least temporarily storing the obtained descriptor; and
   building an anonymous user profile related to communication activities of the user based on the stored descriptor.

2. The method of claim 1, wherein the user traffic identifier comprises a cookie adapted to be included in the communication traffic generated by and addressed to the user communication terminal.

3. The method of claim 2, wherein said assigning the user traffic identifier comprises:
   upon receiving communication traffic originated by the user communication terminal, assessing, by the first device, whether the received communication traffic includes the user traffic identifier; and
   in response to the received communication traffic not including the user traffic identifier, generating a unique and anonymous user traffic identifier to be assigned to a network address of the user communication terminal.

4. The method of claim 3, comprising:
   upon receiving communication traffic originated by the user communication terminal not including the unique and anonymous user traffic identifier, requesting the user communication terminal to re-send the communication traffic for assignment;
   in response to the user communication terminal requesting the user communication terminal to re-send the communication traffic to be assigned, generating the unique and anonymous user traffic identifier; and
   wherein the communicating the unique and anonymous user traffic identifier to the user communication terminal to allow the user communication terminal to include the user traffic identifier in the user traffic includes:
      including the generated unique and anonymous user traffic identifier in a response sent to the user communication terminal,
   wherein the received communication traffic originated by the user communication terminal includes an original destination.

5. The method of claim 4, wherein said requesting the user communication terminal to re-send the communication traffic to a user traffic identifier to be as signed includes:
   sending to the user communication terminal an HTTP message including a URL associated with assigning the user traffic identifier, and including an original URL contained in the communication traffic received from the user communication terminal.

6. The method of claim 4, wherein the response sent to the user communication terminal includes a request for the user communication terminal to re-send the communication traffic with the user traffic identifier for assignment.

7. The method of claim 6, comprising:
   upon receiving, from the user communication terminal, the response including the user traffic identifier, starting monitoring of the user communication traffic, and sending to the user communication terminal a further response requesting the user communication terminal to re-send the communication traffic to the original destination.

8. The method of claim 1, wherein the communication traffic comprises information related to at least one transaction, and the descriptor comprises one or more of: information related to end points involved in the transaction, and information about a time the transaction occurred.

9. The method of claim 1, wherein said monitoring communication traffic originated by the user of the communication terminal includes analyzing communication traffic packets originated by the user communication terminal.

10. The method of claim 1, wherein said building a user profile includes building a list of web pages accessed by the user in a web browsing session.

11. The method of claim 1, wherein monitoring communication traffic originated by a user of a communication terminal includes:
   monitoring, by the first device, communication traffic originated by a user of a communication terminal.

12. The method of claim 1, wherein at least temporarily storing the obtained descriptor comprises:
   responsive to receiving the tracking notification, at least temporarily storing, by a second device, the obtained descriptor, and
   wherein building the anonymous user profile comprises:
      building, by the second device, the anonymous user profile related to communication activities of the user based on the stored descriptor.

13. A system for profiling communication traffic of users in a data network, comprising:
   one or more processors;
   one or more non-transitory computer readable media having instructions stored thereon that, when executed by a processor, cause functions to be performed including:
      monitoring communication traffic originated by or addressed to a communication terminal of a user;
      assessing whether received communication traffic of the user is being monitored based on a user address in the data network and the inclusion in the communication traffic of a unique and anonymous user traffic identifier;
      upon determining that the received communication traffic includes the user traffic identifier, extracting, by a first apparatus, a descriptor of the communication traffic, sending, by the first apparatus, a tracking notification including the extracted descriptor, and allowing the communication traffic to reach an intended destination of the communication traffic; and
   causing at least temporary storage of the extracted descriptor.

14. The system of claim 13, wherein said user traffic identifier comprises a cookie.

15. A data network including the system of claim 13.

16. The system of claim 13, wherein the one or more non-transitory computer readable media having instructions stored thereon that, when executed by a processor, cause functions to be performed including:

requesting the user communication terminal to re-send the communication traffic to be assigned a user traffic identifier in case the received communication traffic does not include the user traffic identifier;

assigning to the user of the communication terminal a unique and anonymous user traffic identifier, wherein the user traffic identifier is related to a user address assigned to the communication terminal in the data network, and wherein the user traffic identifier is adapted to be included in the communication traffic with respect to that user; and communicating the unique and anonymous user traffic identifier to the user communication terminal to allow the user communication terminal to include the user traffic identifier in user traffic.

17. The system of claim 13, wherein assigning to the user of the communication terminal a unique and anonymous user traffic identifier includes:

generating the unique user traffic identifier; and sending a response to the user communication terminal including the user traffic identifier, the response requesting the user communication terminal to re-send the communication traffic to an original destination including the user traffic identifier.

18. The system of claim 13, wherein monitoring communication traffic originated by a user of a communication terminal includes:

monitoring, by the first apparatus, communication traffic originated by a user of a communication terminal.

19. The system of claim 13, wherein the one or more non-transitory computer readable media having instructions stored thereon that, when executed by a processor, cause functions to be performed including:

responsive to receiving the tracking notification, storing, by a second apparatus, the extracted descriptor; and building, by the second apparatus, an anonymous user profile related to communication activities of the user based on the descriptors stored in the second apparatus.

* * * * *